US011860962B1

(12) United States Patent
Yang

(10) Patent No.: US 11,860,962 B1
(45) Date of Patent: Jan. 2, 2024

(54) SYSTEM AND METHOD FOR SELECTING INFORMATION FOR DISPLAY BASED ON PAST USER INTERACTIONS

(71) Applicant: GOOGLE LLC, Mountain View, CA (US)

(72) Inventor: Don Hsi-Yun Yang, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/675,296

(22) Filed: Feb. 18, 2022

Related U.S. Application Data

(60) Continuation of application No. 16/390,692, filed on Apr. 22, 2019, now Pat. No. 11,288,440, which is a continuation of application No. 15/071,982, filed on Mar. 16, 2016, now Pat. No. 10,311,135, which is a division of application No. 12/573,423, filed on Oct. 5, 2009, now Pat. No. 9,323,426.

(51) Int. Cl.
| | |
|---|---|
| *G06F 3/048* | (2013.01) |
| *G06F 16/9535* | (2019.01) |
| *G06F 3/0483* | (2013.01) |
| *G06F 40/134* | (2020.01) |
| *G06F 40/143* | (2020.01) |
| *G06F 40/14* | (2020.01) |
| *G06F 3/0482* | (2013.01) |
| *G06F 3/04842* | (2022.01) |
| *G06F 7/08* | (2006.01) |

(52) U.S. Cl.
CPC ........ *G06F 16/9535* (2019.01); *G06F 3/0482* (2013.01); *G06F 3/0483* (2013.01); *G06F 3/04842* (2013.01); *G06F 7/08* (2013.01); *G06F 40/134* (2020.01); *G06F 40/14* (2020.01); *G06F 40/143* (2020.01)

(58) Field of Classification Search
CPC .. G06F 16/9535; G06F 40/134; G06F 40/143; G06F 40/14; G06F 3/0482; G06F 3/0483; G06F 3/04842; G06F 7/08
See application file for complete search history.

(56) References Cited

U.S. PATENT DOCUMENTS

| | | |
|---|---|---|
| 6,182,133 B1 | 1/2001 | Horvitz |
| 6,275,862 B1 | 8/2001 | Sharma et al. |
| 6,279,017 B1 | 8/2001 | Walker |
| 6,349,307 B1 | 2/2002 | Chen |
| 6,667,751 B1 | 12/2003 | Wynn et al. |
| 6,697,844 B1 | 2/2004 | Chan et al. |

(Continued)

OTHER PUBLICATIONS

Yasufumi Takama, Noriaki Mitsuhashi, "Visual Similarity Comparison for Web Page Retrieval", 2005 4 pages. (Year: 2005).*

(Continued)

*Primary Examiner* — Haoshian Shih
(74) *Attorney, Agent, or Firm* — Botos Churchill IP Law

(57) ABSTRACT

A system and method is provided that automatically predicts the link that a user would like to follow by collecting and modeling user actions, and navigates to the link. In one aspect, the system may store a history of the user's manipulation of a browser's user interface, and predict the link of greatest interest to the user by comparing the visual similarity of potential links with previously selected and non-selected links, and estimating the location of the screen that the user is currently viewing.

26 Claims, 20 Drawing Sheets

(56) References Cited

U.S. PATENT DOCUMENTS

| | | | |
|---|---|---|---|
| 6,781,571 | B2 | 8/2004 | Bates et al. |
| 7,293,007 | B2 | 11/2007 | Ma et al. |
| 7,555,713 | B2 | 6/2009 | Yang |
| 7,610,313 | B2 | 10/2009 | Kawai et al. |
| 7,765,471 | B2 | 7/2010 | Walker |
| 7,774,721 | B2 | 8/2010 | Milic-Frayling et al. |
| 7,797,635 | B1 | 9/2010 | Denise |
| 7,861,163 | B2 | 12/2010 | Walker |
| 7,921,117 | B2 | 4/2011 | Saxena |
| 8,156,058 | B1 | 4/2012 | Heidenreich et al. |
| 8,219,498 | B2 | 7/2012 | Banerjee et al. |
| 8,385,971 | B2 | 2/2013 | Rhoads |
| 8,539,359 | B2 | 9/2013 | Rapaport et al. |
| 8,560,964 | B2 * | 10/2013 | Dodson ............... G06F 16/957 715/744 |
| 2001/0020238 | A1 | 9/2001 | Tsuda |
| 2003/0052918 | A1 | 3/2003 | Drane et al. |
| 2003/0101413 | A1 | 5/2003 | Klein et al. |
| 2005/0289141 | A1 | 12/2005 | Baluja |
| 2007/0022102 | A1 | 1/2007 | Saxena |
| 2007/0174790 | A1 | 7/2007 | Jing et al. |
| 2007/0201752 | A1 | 8/2007 | Gormish et al. |
| 2008/0010292 | A1 | 1/2008 | Poola |
| 2008/0114800 | A1 | 5/2008 | Gazen |
| 2008/0222518 | A1 | 9/2008 | Walker |
| 2008/0235585 | A1 | 9/2008 | Hart |
| 2008/0243637 | A1 | 10/2008 | Chan et al. |
| 2009/0049062 | A1 | 2/2009 | Chitrapura et al. |
| 2009/0063538 | A1 | 3/2009 | Chitrapura et al. |
| 2009/0119254 | A1 | 5/2009 | Cross et al. |
| 2009/0171928 | A1 | 7/2009 | Stergiou |
| 2010/0048242 | A1 | 2/2010 | Rhoads et al. |
| 2010/0205541 | A1 | 8/2010 | Rapaport et al. |

OTHER PUBLICATIONS

Janez Brank, Natasa Milic Frayling, Anthony Frayling, and Gavin Smyth, Predictive Algorithms For Browser Support of Habitual User Activities on the Web, IEEE, 2005, 7 pages.

Melanie Kellar and Carolyn Watters, Using Web Browser Interactions To Predict Task, May 23-26, 2006, 2 pages.

Predictive Algorithms For Browser Support of Habitual User Activities On The Web [online]. [Retrieved May 11, 2009]. Retrieved from the internet. < http:/lresearch.microsoft.com/apps/pubs/default>, 1 page.

* cited by examiner

| ID | Time | Action | Parameter |
|---|---|---|---|
| 30 | 3:01 | Type URL | f.com |
| 31 | 3:03 | Type text | "Joseph Smith" |
| 32 | 3:04 | Select link | f.com/rt2yh4g5fb ("Sign In") |
| 33 | 3:04 | Unselected link | f.com/psfa ("Privacy Policy") |
| 34 | 3:04 | Unselected link | f.com/qpsf ("Check email") |
| 35 | 3:08 | Unselected link | f.com/j714k?j=10 ("My Albums") |
| 48 | 5:53 | Select link | g.com/log-in ("Log In") |
| 49 | 5:53 | Unselected link | g.com/tti ("Terms of Use") |
| 64 | 9:18 | Type URL | i.com |
| 65 | 9:20 | Type text | "JoeSmith" |

1401, 1402, 1403, 1404, 1405

Candidate Locations

| Rank | Location | Type |
|---|---|---|
| 5 = 3 + 2 | i.com/sig | Link ("Sign In") |
| 0 | i.com/sup | Link ("Support") |
| 0 | h.com | Back |
| -2 | i.com/pp | Link ("Privacy Policy") |
| -2 | i.com/tou | Link ("Terms of Use") |

Shall I compare thee to a summer's day? Thou art more lovely and more <u>temperate</u>:

Rough winds do shake the darling buds of May, And <u>summer's</u> lease hath all too short a date:

Sometime too hot the eye of heaven shines, And often is his gold complexion dimmed, And every fair from fair sometime declines, By chance, or <u>nature's</u> changing course untrimmed:

But thy <u>eternal</u> summer shall not fade, Nor lose possession of that fair thou ow'st, Nor shall death brag thou wand'rest in his shade, When in eternal lines to <u>time</u> thou grow'st, So long as men can breathe or eyes can see, So <u>long</u> lives this, and this gives life to thee.

Shall I <u>compare</u> thee to a summer's day? Thou art more lovely and more temperate:

<u>Rough</u> winds do shake the darling buds of May, And summer's lease hath all too short a date:

Shall I compare thee to a summer's day? Thou art more lovely and more <u>temperate</u>:

Rough winds do shake the darling buds of May, And <u>summer's</u> lease hath all too short a date:

Sometime too hot the eye of heaven shines, And often is his 1502    1512 gold complexion dimmed,

And every fair from fair sometime declines, By chance, or <u>nature's</u> changing course untrimmed:

But thy <u>eternal</u> summer shall not fade, Nor lose possession of that fair thou ow'st, Nor shall death brag thou wand'rest in his shade, 1503    1513

When in eternal lines to <u>time</u> thou grow'st, So long as men can breathe or eyes can see, So <u>long</u> lives this, and this gives life to thee.

Shall I <u>compare</u> thee to a summer's day? Thou art more lovely and more temperate:

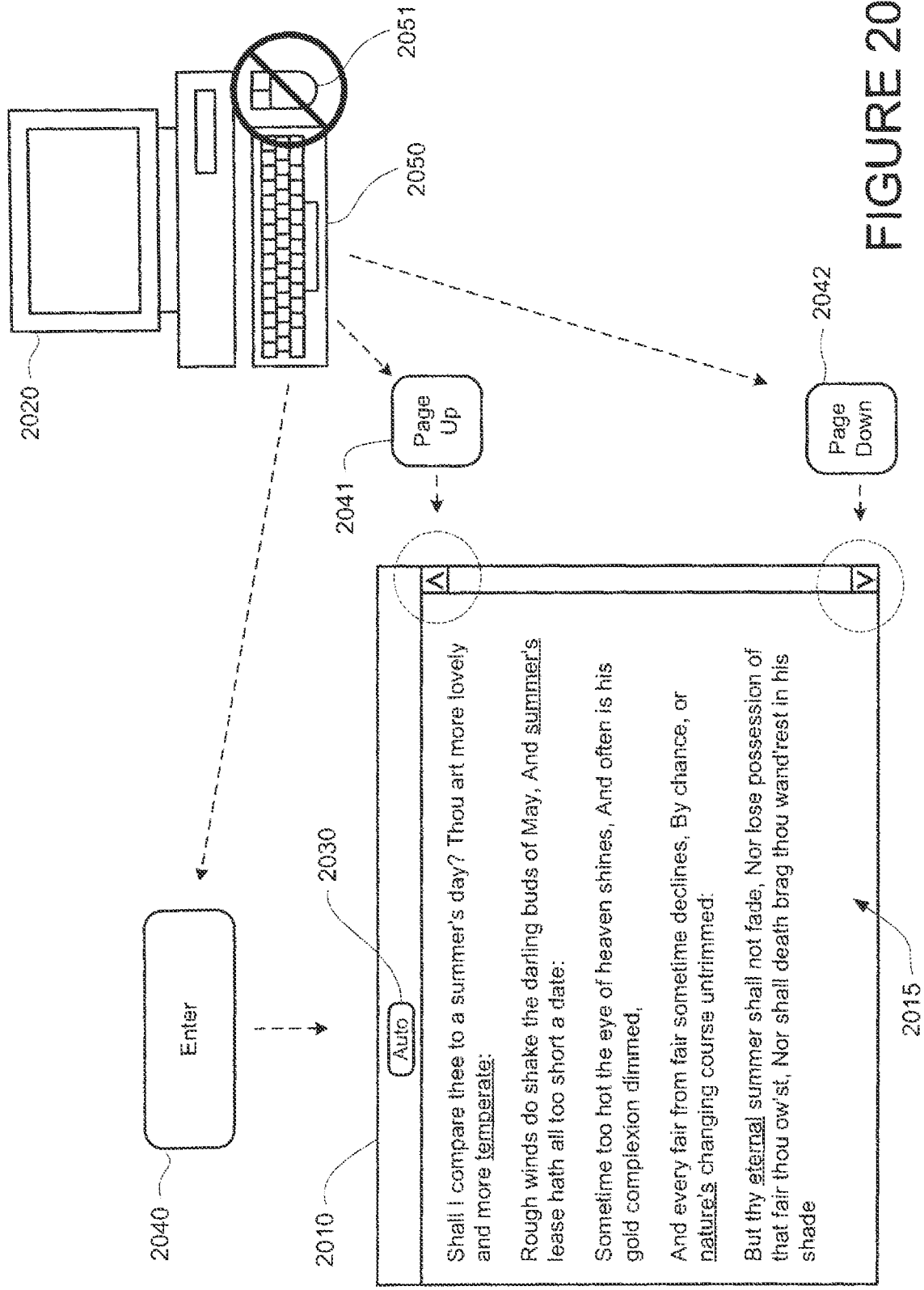

SYSTEM AND METHOD FOR SELECTING INFORMATION FOR DISPLAY BASED ON PAST USER INTERACTIONS

CROSS-REFERENCE TO RELATED APPLICATIONS

The present application is a continuation application of U.S. patent application Ser. No. 16/390,692, filed Apr. 22, 2019 which is a continuation application of Ser. No. 15/071, 982, filed Mar. 16, 2016, now U.S. Pat. No. 10,311,135, which is a divisional of U.S. patent application Ser. No. 12/573,423, filed Oct. 5, 2009, now U.S. Pat. No. 9,323,426 the disclosure of which is incorporated herein by reference.

BACKGROUND OF THE INVENTION

Users may view web pages by using a browser to load and display the web page (e.g., Google's Chrome browser, the Opera browser, Microsoft's Internet Explorer, Mozilla's Firefox, Apple's Safari, Lynx, Links and w3m). A user may also browse other pages by following hyperlinks on the web page to other web pages. Hyperlinks often include a visual component that is displayed to the user, such as the word "here" in the text "Click here to learn more", and a component that defines the target location of the link, such as "www.a.com/home", that may or may not be visible to the user (absent viewing the source code of the web page).

Browsers typically provide other navigation features that allow users to load web pages from locations on a network. By way of example, browsers typically provide an on-screen "back" button, which takes the user back to the last-viewed location when the user clicks the button with a mouse (unless the user just clicked the back button, in which case selecting the "forward" button will return the user to the last-viewed location). Many browsers also provide a selectable history of locations that have been visited by the user within the last browsing session or longer.

Some websites require a user to fill in forms, which may make it difficult for users to rely solely on a mouse without using a keyboard.

Many browsers allow navigation functions to be selected by keyboard. For instance, pressing the backspace button on a keyboard may send a signal to the processor such that the processor, in accordance with the instructions of the executed browser program, interprets the backspace signal as a request by the user to load the information at the last-viewed location. Many browsers also allow users to iterate through links by pressing one or more particular keys, such as by pressing the tab key repeatedly. Most browsers also permit a user to navigate to a link by searching for text displayed by, or near, the link. Moreover, some websites, such as Google's Gmail site, allow users to perform actions in connection with the site based on keyboard shortcuts. Certain browsers also tend to be more text-based than others, such as Lynx, Links and w3m.

Various types of information at various locations may be viewed by users. For example, the target location of a hyperlink on a web page may be another location on the same web page, another web page of the same website (e.g., a link from "www.a.com/home" to "www.a.com/purchasepage"), or a different web page of a different website (e.g., a link from "www.a.com/home" to "www.b.com"). The information at a location accessed by a browser may comprise a document (e.g., an HTML web page), a content file to be rendered by the browser (either natively or with the assistance of a plug-in), or a program to be downloaded and executed by the processor.

Systems and methods are also used to analyze the hyperlinks on a web page and determine which of the various targets may be of greatest interest to a user. For example, Google uses many signals to examine the link structure of the web and determine which pages are most important.

BRIEF SUMMARY OF THE INVENTION

In one aspect, a method is provided that includes displaying, on an electronic display and via a user interface, a first document having a plurality of links, where each link identifies the location of another document. A request is then received from a user to navigate from the first document. A processor selects a link from among the plurality of links based on a user's manipulation of the user interface where the manipulation occurred prior to request to navigate. The method then displays, on an electronic display, a second document referenced by the selected link.

Another method in accordance with another aspect relates to computer-implemented method of selecting links, where each link is displayed in a document at one location of a network, identifies information at another location of the network, and has a visual characteristic. The method involves displaying, to a user, a first document at a first location on a network, the first document containing a plurality of links to other documents at other locations of the network. It also includes receiving a request from a user to navigate to a different location of the network. The method further ranks the links displayed in the first document based on a ranking value, the ranking value being based on a comparison of the plurality of links in the first document with a plurality of prior links, where the prior links were displayed to the user in documents from other locations of the network, and where the links in the first document are further ranked based on their similarity with the prior links. The method then selects a location identified by a link displayed in the first document based on the ranking value of the link. The information from the selected location is received and displayed.

Still another aspect relates to a method that includes: displaying, on an electronic display and via a user interface, first information received from a first location; receiving a request, in response to actuation of a user input device, to display information from a different location via the user interface; accessing a set of locations different from the first location, the members of the set including a location identified by the first information, and further including a location from which information was previously viewed via the user interface; selecting, with a processor, a location from among the members of the set based on prior actuations of a user input device that occurred prior to receiving the request; and receiving second information from the selected location; and displaying, on an electronic display, the second information.

A further aspect provides a method including: displaying, on an electronic display, a first portion of a document within a display area of the electronic display, the document including a plurality of links targeting other documents, each link being at a different position within the display area relative to the other links included in the document; receiving a signal from a user input device that is associated with a portion change command, where a portion change command comprises a command to change the portion of the document that is displayed within the display area; determining a time period associated with the user's display of the first portion prior to receiving the command; displaying a second portion within the display area in response to the portion change command; receiving a signal from a user input device that is associated with navigation command, where a navigation command comprises a command to display a different document; selecting a link displayed in the second portion based on the time period determined for the first portion in response to the navigation command; and displaying the document targeted by the selected link.

Yet another aspect relates to system that includes a processor, instructions operable by the processor, a medium storing the instructions, an electronic memory storing data accessed by the processor, an electronic display displaying data processed by the processor in accordance with the instructions; and a user input device. The instructions include: displaying, on the electronic display and via a user interface, first information received from a first location; receiving a request, in response to actuation of the user input device, to display information from a different location via the user interface; accessing a set of locations different from the first location, the members of the set including a location identified by the first information, and further including a location from which information was previously viewed via the user interface; selecting, with a processor, a location from among the members of the set based on the prior actuations of the user input device that occurred prior to receiving the request; receiving second information from the selected location; and displaying, on the electronic display, the second information.

Still another system includes a first computer at a first node of a network, a second computer at a second node of a network, a third computer at a third node of a network, and a client device at a node of the network different from the first, second and third nodes. The client device includes a user input device, an electronic display, a processor and instructions operable by the processor. The instructions of the client device include: displaying, on the electronic display, a first document received from the first computer, the first document including a second link targeting the second node and a third link targeting the third node; receiving a request from the user input device to display another document; selecting, the second or third link based on whether the second link or third link is more similar to prior links selected based on requests received from the user input device; and displaying, on the electronic display, information received from the second computer when the second link is selected by the processor and information received from the second computer when the second link is selected by the processor.

A computer-usable medium storing a program executable by a processor is also provided. The medium comprises computer code that displays a first document having a plurality of links, where each link identifies the location of another document and computer code that receives a request from a user to navigate from the first document. It also comprises computer code that selects, with a processor, a link from among the plurality of links based on a user's manipulation of the user interface where the manipulation occurred prior to request to navigate. Yet further, the medium comprises computer code that displays, on the electronic display, a second document referenced by the selected link.

BRIEF DESCRIPTION OF THE DRAWINGS

FIG. 14 is a diagram of sample data in accordance with an aspect of the system and method.

FIG. 15 is a diagram of sample data and screen shots in accordance with an aspect of the system and method.

FIG. 20 is a depiction of a system in accordance with an aspect that is operable solely by a few keys of a keyboard.

DETAILED DESCRIPTION

In one aspect, a system and method is provided whereby the system predicts the link that a user would like to follow by collecting and modeling user actions. For instance, the system may store a history of the user's manipulation of a browser's user interface and predict the link of greatest interest to the user by modeling the user's prior actions. In still another aspect, the system may be used to provide an improved keyboard browsing experience.

Figure 1:
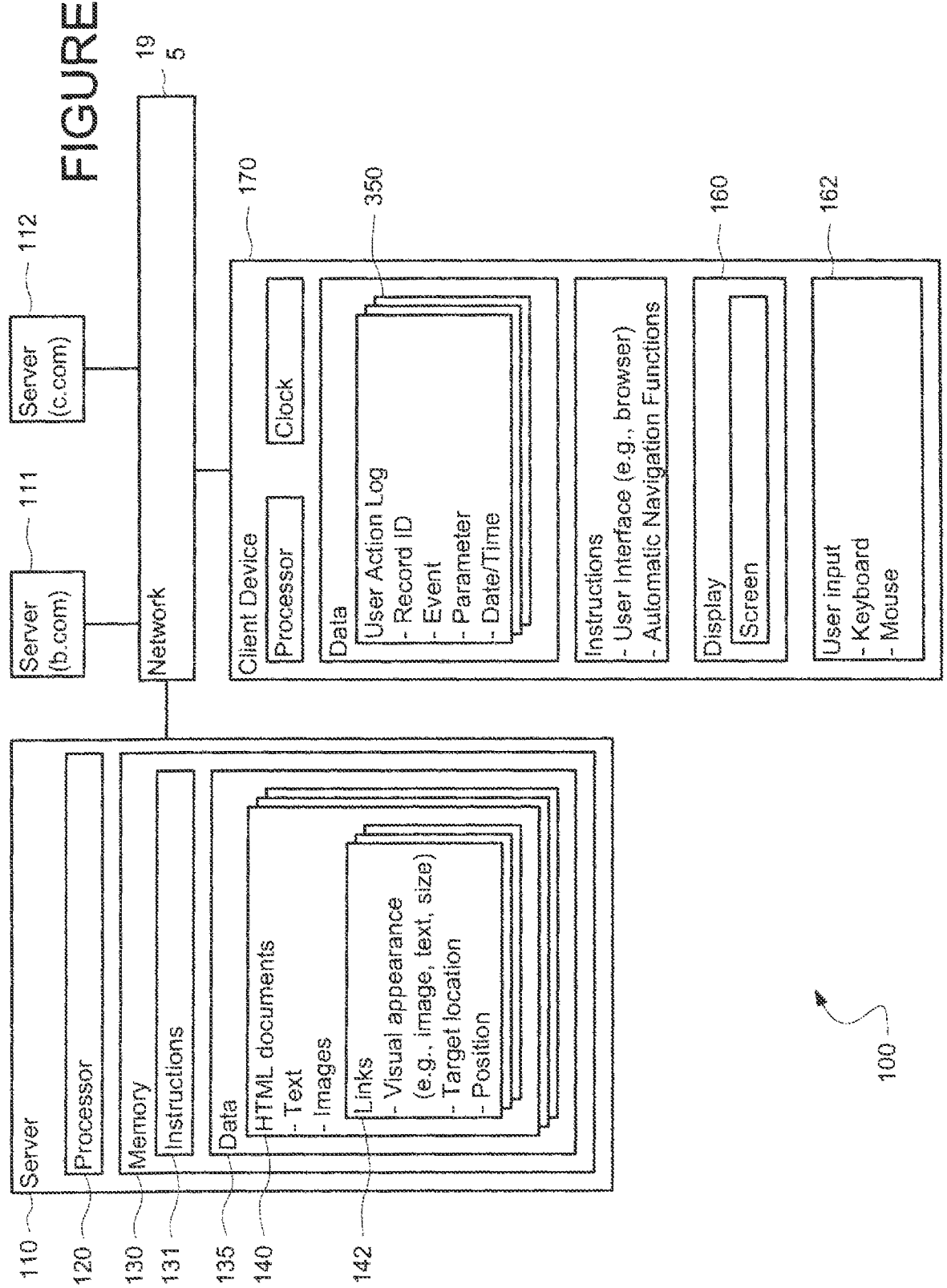
FIG. 1 is a functional diagram of a system in accordance with an aspect of the system and method.
Figure 2:
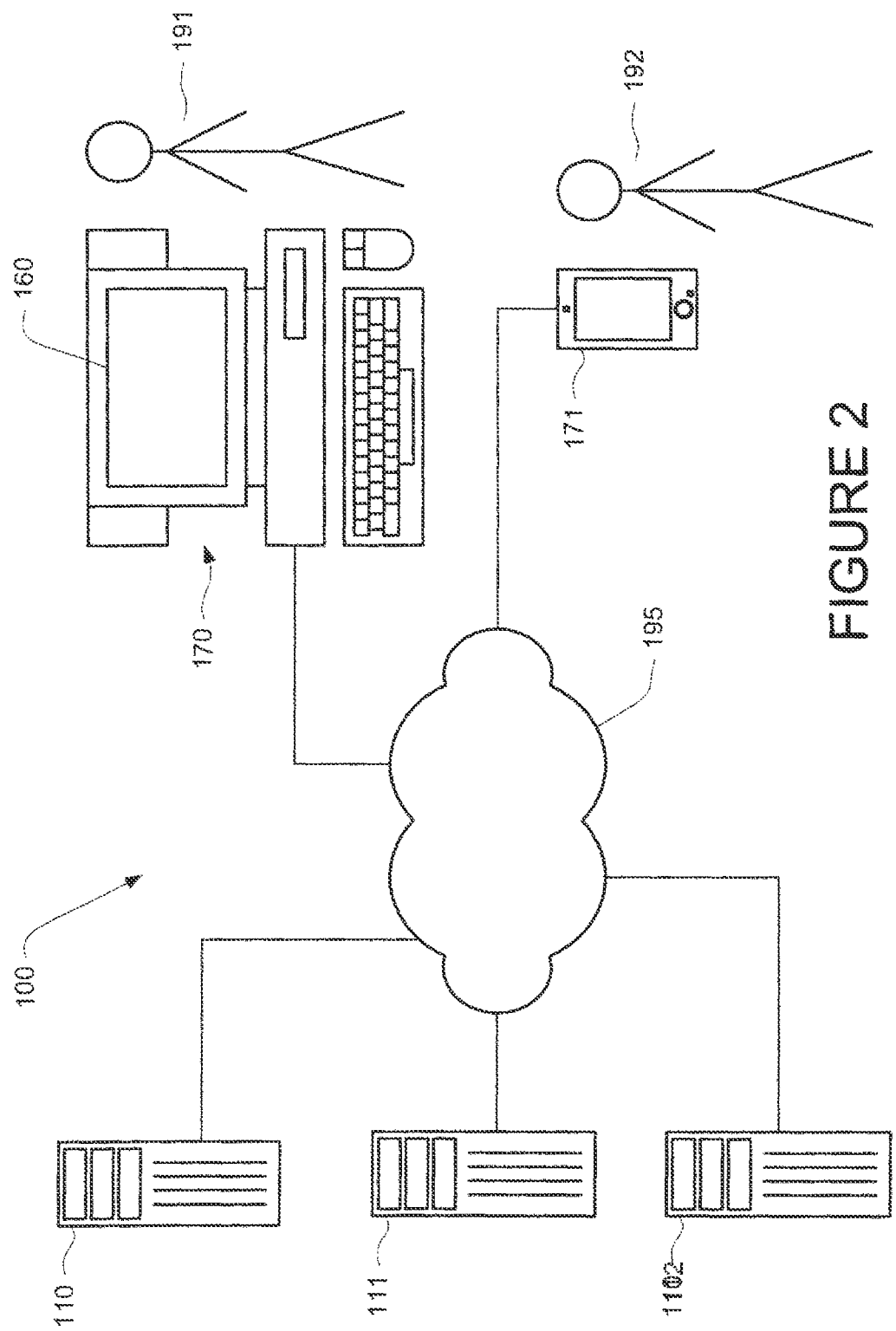
FIG. 2 is a pictorial diagram of a system in accordance with an aspect of the system and method.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 170-71 may be a personal computer intended for use by a person 190-191, and have all of the components normally used in connection with a personal computer such as a central processing unit (CPU), memory (e.g., RAM and internal hard drives) storing data and instructions, an electronic display 160 (e.g., a monitor having a screen, a small LCD touch-screen, a projector, a television, or any other electrical device that is operable to display information), user input 162 (e.g., a mouse, keyboard, touch-screen or microphone), camera, speakers, a network interface device, and all of the components used for connecting these elements to one another.

Although the client devices 170-71 may comprise a full-sized personal computer, the system and method may also be used in connection with mobile devices capable of wirelessly exchanging data with a server over a network such as the Internet. By way of example only, client device 171 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

User action log 350 may store data identifying actions performed by the user, information that was presented to the prior to or at the time the action was performed, and the dates and times associated with same. For example and as explained further below, the system may collect and store a set of signals representative of actions performed by users. Data representative of these signals, such as data reflecting user actuation of a user device (e.g., pressing a key on a keyboard) and the date and time of the actuation, may be stored by processor 120 in log 350 as the processor receives the signals. Other information may be stored as well, such as the date and time that the web page started or stopped loading (which may reflect when information became visible to the user). Log 350 may further store each link displayed to the user, including the link's target location, its visual characteristics (e.g., its displayed text, displayed image, color, font size, surrounding text, etc.) and its position on the web page. The log may further store a record of all pages that a user ever visited.

The instructions of the client device may include a user interface for obtaining and viewing information located at different locations of the network, such as a browser. The instructions may further include routines for performing automatic navigation functions as described in more detail below. The routines may be included with the native code of the browser, operate as plug-in to the browser, or operate as a separate application.

The data provided by server 110 may include a number of different HTML documents 140, each of which may include a variety of links to other locations of the document, server or network. In that regard, server 110 (associated with fictional website www.a.com) may serve HTML documents that contain links to information at other servers such as web server 111 (associated with the fictional website www.b-.com) and web server 112 (associated with the fictional website www.c.com).

In addition to the operations illustrated in the figures, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, system and methods in accordance with the present invention may include different data values, types and configurations, and may be provided and received at different times (e.g., via different web pages) and by different entities (e.g., some values may be pre-suggested or provided from different sources).

Figure 3:
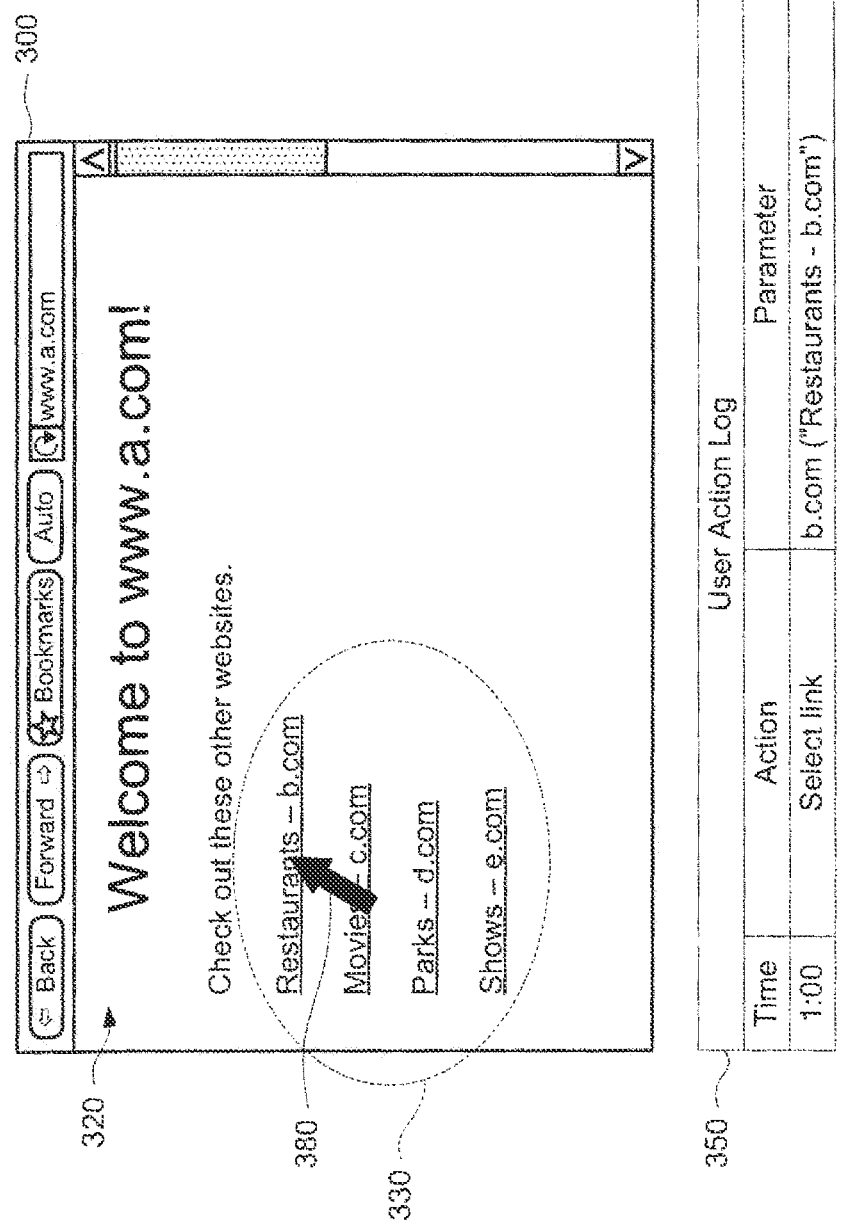
FIG. 3 is a screen shot and diagram of sample data in accordance with an aspect of the system and method.

As shown in FIG. 3, a user interface for obtaining and viewing information located at different locations of a network, such as browser 300, may be used to display web pages such as web page 320. The web page may include a variety of hyperlinks 330 that are displayed on documents provided by one website (e.g., "www.a.com") and target other websites (www.b.com). These target locations may be associated with documents (e.g., other web pages, downloadable PDF files) or other information to be accessed by the browser.

When a user performs actions in connection with the browser, the system may store information that identifies the action. By way of example, the system may store a log 350 of the actions performed by the user. If the user used mouse cursor 380 to select the link with the text "Restaurants—b.com", the log may thus store a record in the log that identifies the type of action performed by the user ("Select link"), the time of the action ("1:00") and other information associated with the action (e.g., that the selected link targeted "b.com," the text of the link was "Restaurants—b.com"). The log may be stored in the memory of the client device or elsewhere.

Figure 4:
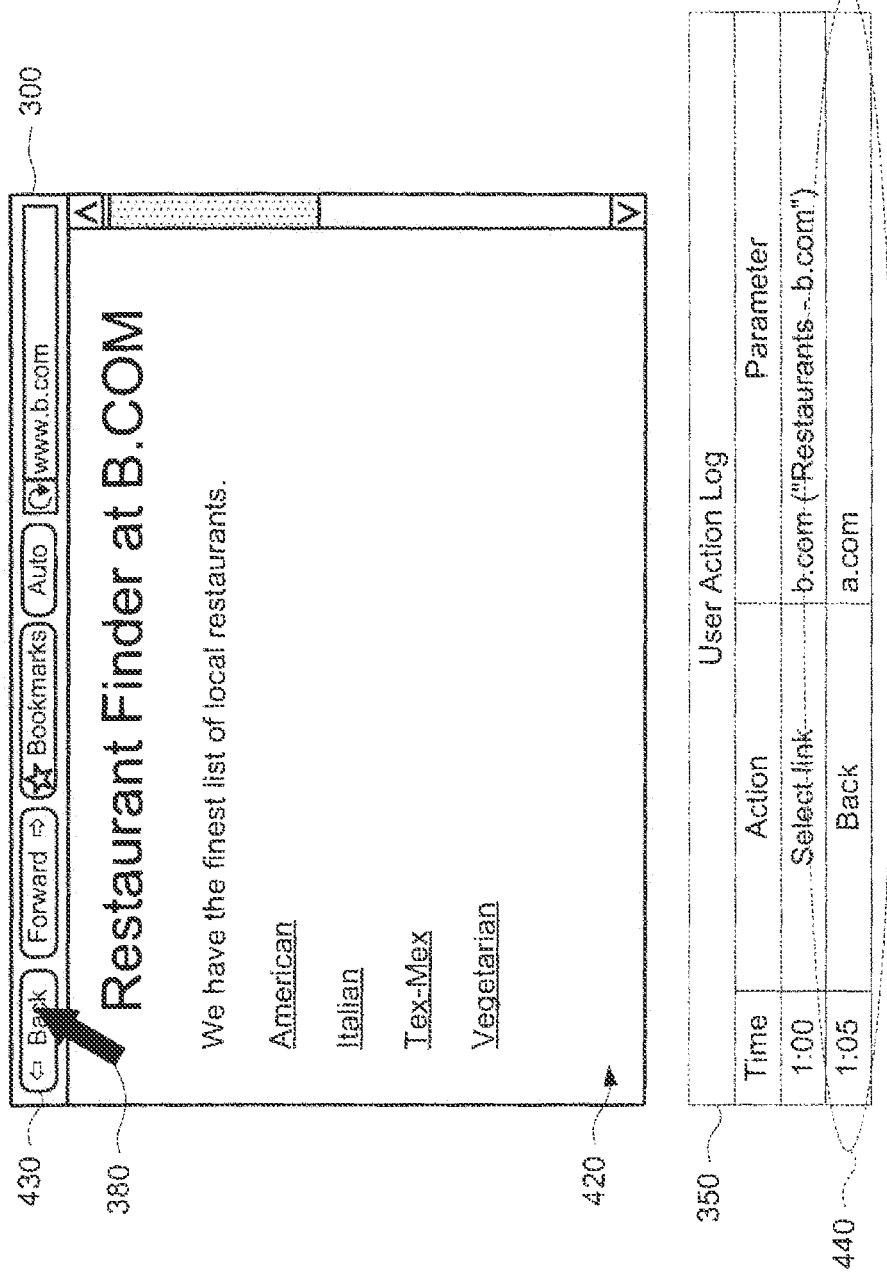
FIG. 4 is a screen shot and diagram of sample data in accordance with an aspect of the system and method.
Figure 5:
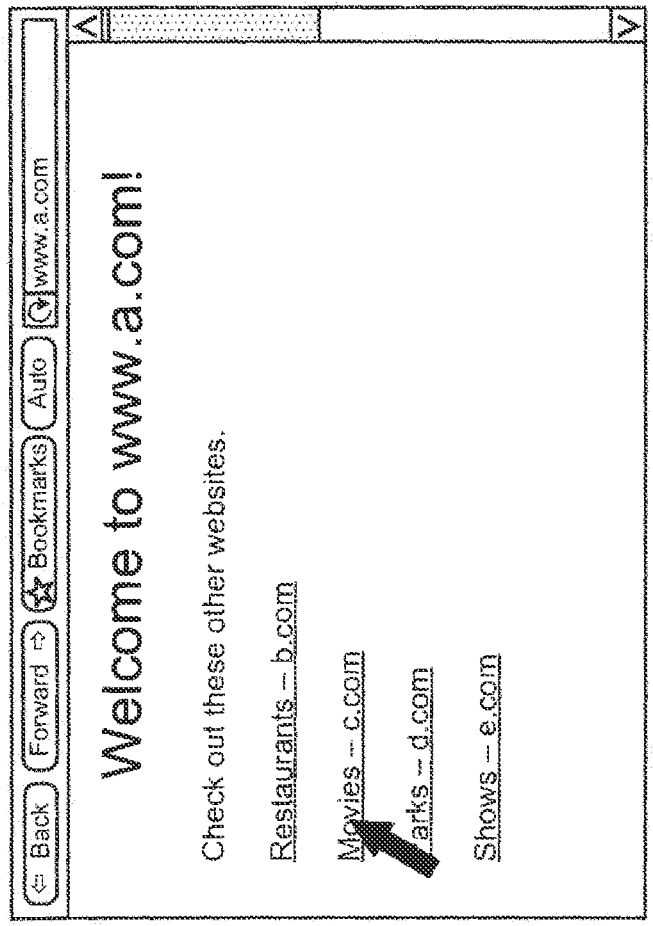
FIG. 5 is a screen shot and diagram of sample data in accordance with an aspect of the system and method.

FIGS. 4-5 illustrate a series of other user events that may be captured and stored by the system. For example, as shown in FIG. 4, the user may use cursor 380 to select the back button 430, which causes the browser to request information from the most recently visited location (i.e., excluding the current location). This action may be stored in the user action log 350 (record 440), along with the information identifying the page that the user elected to go back to. As shown in FIG. 5, the user may return to the prior page and then select another link (e.g., "movies—c.com") which is also stored in the user action log 350 as action 540. The user may subsequently engage in other actions as reflected in the user action log 350 of FIG. 6.

Figure 6:
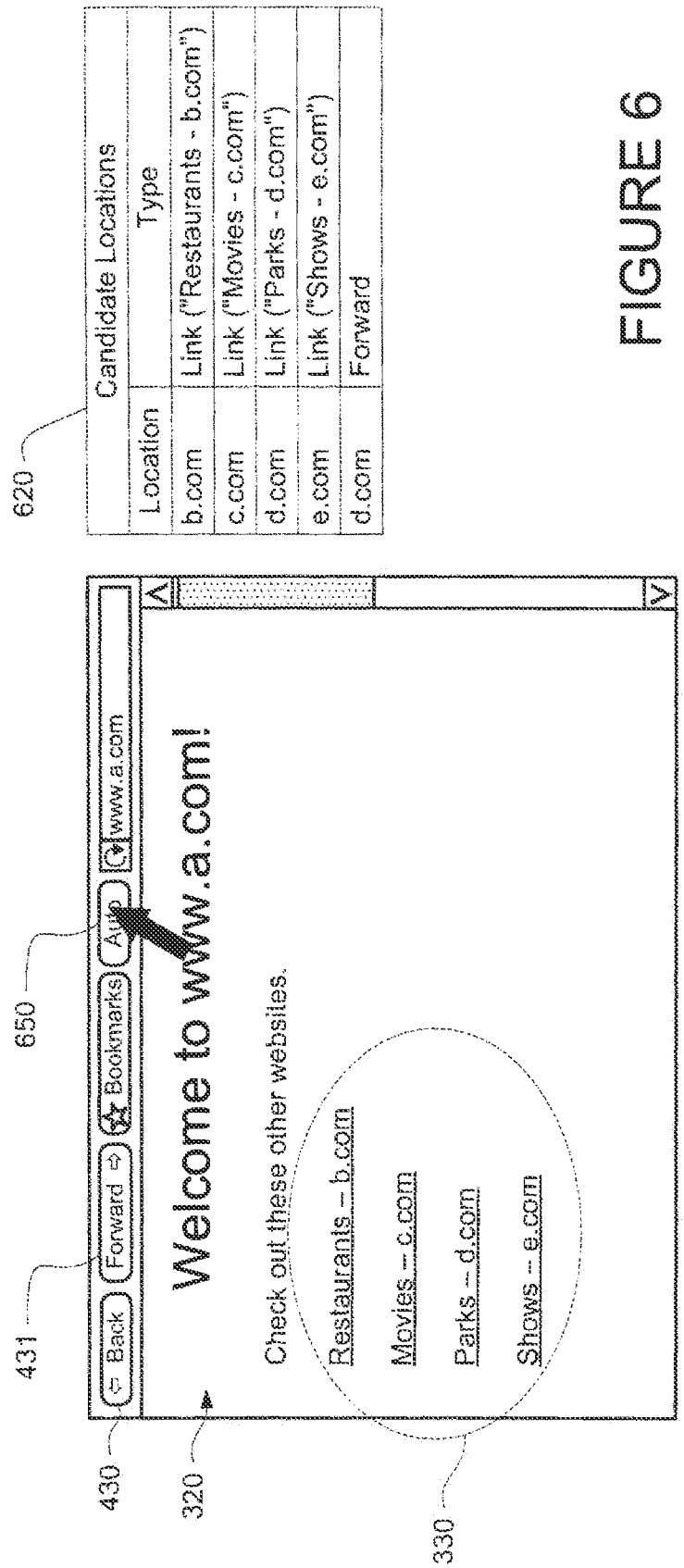
FIG. 6 is a screen shot and diagram of sample data in accordance with an aspect of the system and method.

The user may also allow the browser to automatically select the next location to view. For example, if the processor receives a signal indicating that the user pressed the "Enter" key on the keyboard, the processor may interpret the signal as a request to obtain information from another web page, and a command that the browser select the link based on an estimate of the user's interest. The browser may also include a special button 650 as shown in FIG. 6, or some other feature, that the user may click that will cause the browser to select the next location to visit.

The system may select the next location from a variety of potential locations. As shown in FIG. 6, the candidate locations 620 may include all of the links 330 contained in the HTML document displayed as web page 320. It may also include any previously-visited locations, or other locations that the system may determine are likely to be of interest to the user. The system may also select from a subset of all previously-visited locations, such as the locations to which the user would proceed if the user selected the back button 430 or forward button 431. In that regard, the system may create, either in response to the request or in advance of the request, a set of candidate locations from which the system will select a location (and subsequently display the information at that location).

The system may further select the location based on the user's prior actions.

Figure 7:
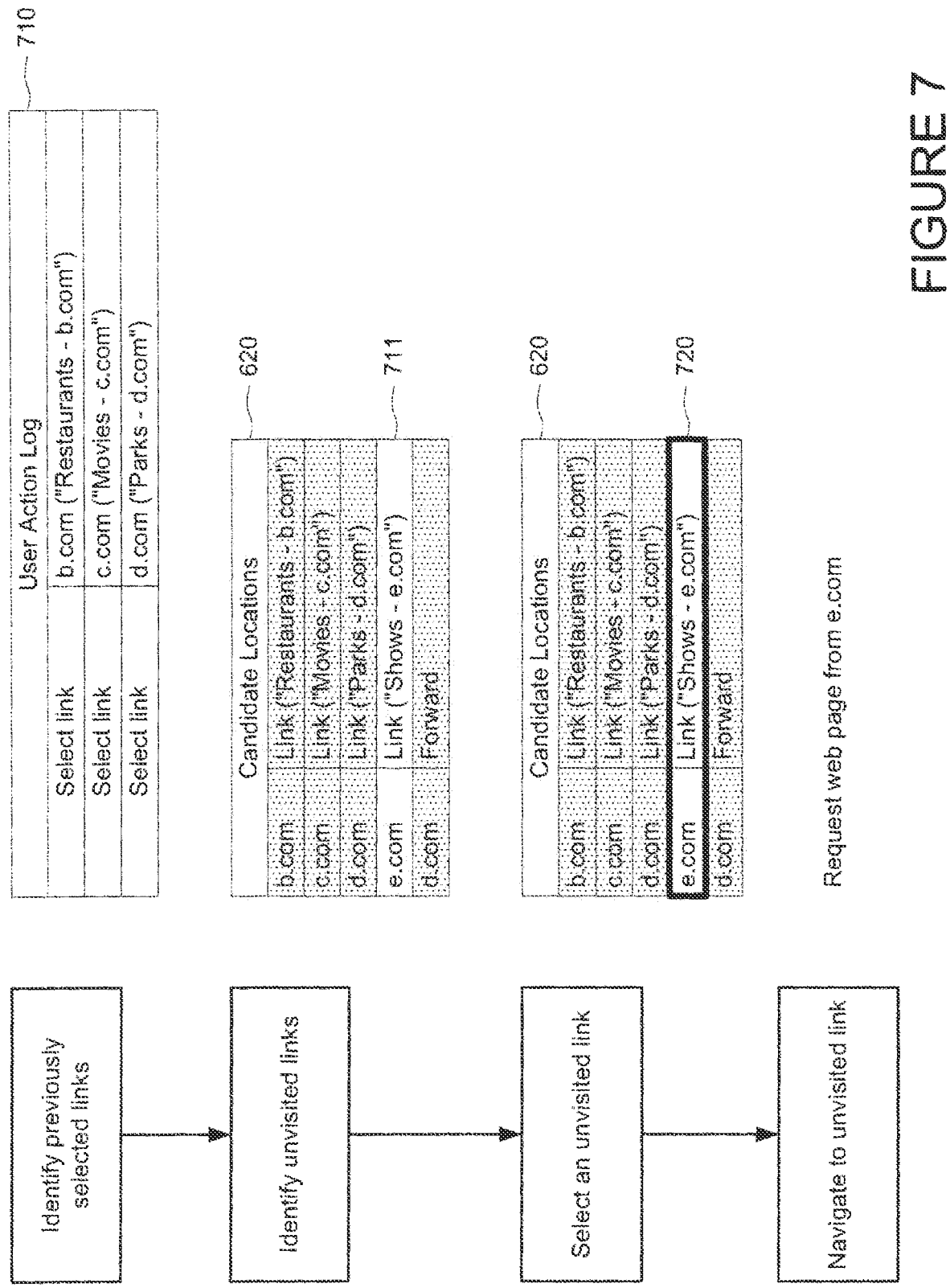
FIG. 7 is a flow chart and a diagram of sample data in accordance with an aspect of the system and method.

In one aspect, the system may automatically select an unvisited link from the currently displayed document if the other links of the currently-displayed page have been visited. By way of example and as shown in FIG. 7, the processor may query the user action log 350 and identify all of the links on the web page that were visited by the user, the results being shown in list 710. If the user action log indicates that the link was previously selected, it may be removed from the list of candidate locations 620 (as indicated by the grayed links). If there is only one unvisited link, as is the case of link 711 in FIG. 7, the system may select the one unvisited link. If more than one unvisited link is found, one of the unvisited links may be selected based on its position on the page relative to other links, randomly, or in accordance with other methods that are both described and not described herein.

Figure 8:
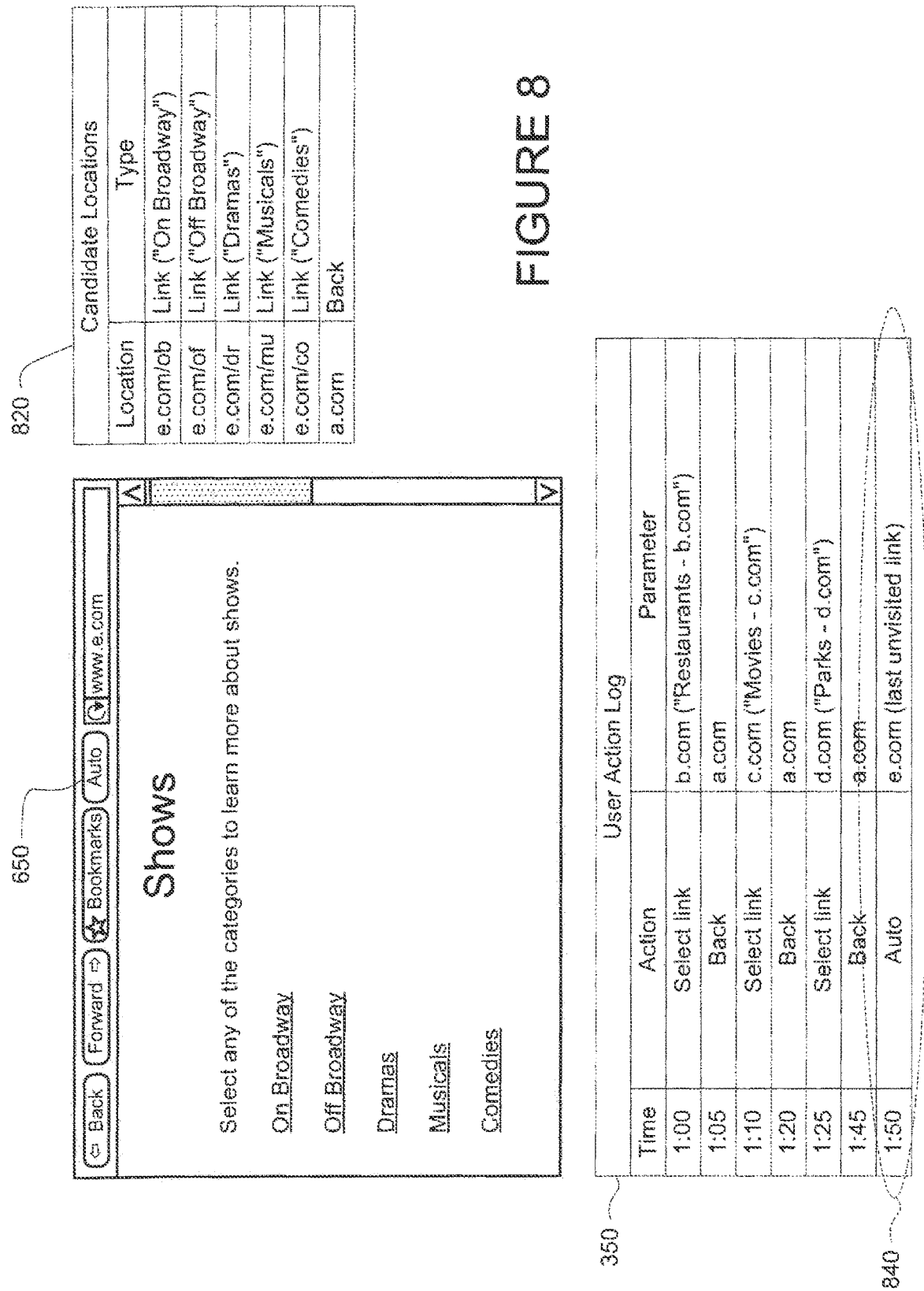
FIG. 8 is a screen shot and diagram of sample data in accordance with an aspect of the system and method.

Once the system selects the link, the browser may navigate to the selected link as shown in FIG. 8. The user action log may also be updated to store a record 840 of the user's action of allowing the browser to automatically select the next location.

Figure 9:
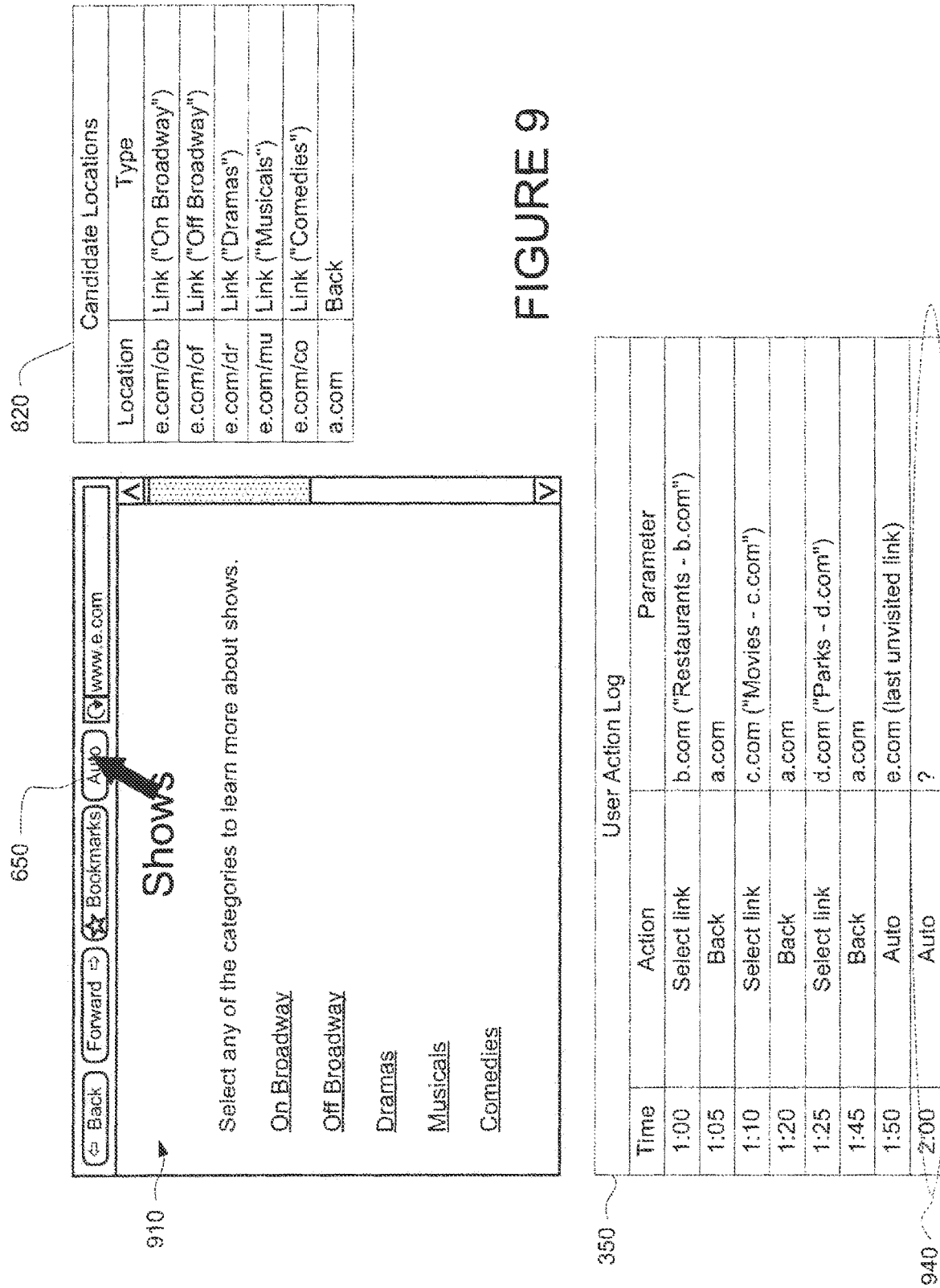
FIG. 9 is a screen shot and diagram of sample data in accordance with an aspect of the system and method.

The system may also look for patterns in the user's prior usage to determine the link that is likely to be of the greatest interest to the user. FIG. 9 continues the example of the prior figures, i.e., the user automatically navigated from www.a.com to www.e.com. As shown in the figure and record 940, the user may again select the auto button 650 or otherwise indicate a desire to navigate to another network location without identifying the network location. In response, the processor may generate a list of candidate locations 820.

Figure 10:
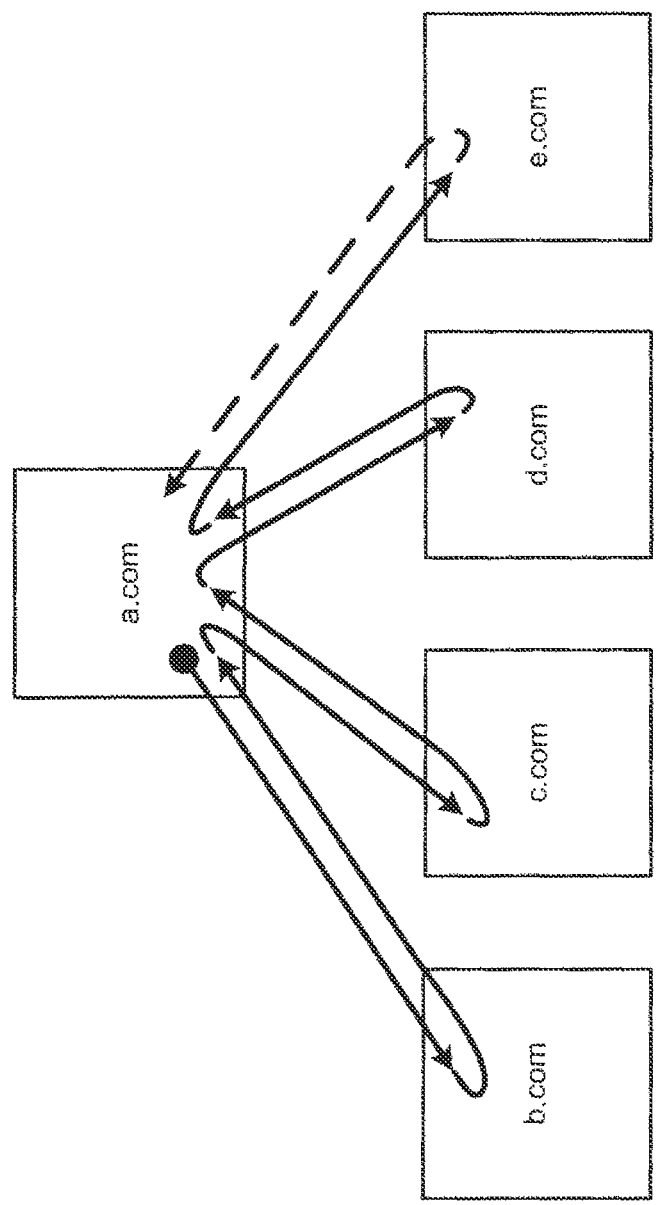
FIG. 10 is a functional diagram of a user's navigation of websites in accordance with an aspect of the system and method.

FIG. 10 illustrates a usage pattern that may be identified by the system. Consistent with the prior figures, the user started at website a.com. The user then (1) went to b.com and back to a.com, (2) went to c.com and back to a.com, (3) went to d.com and back to a.com, and finally (4) went to e.com. The user is now indicating that he or she wishes to navigate to another website. In that regard, the user's actions fit a pattern of starting at a.com, selecting a previously-unselected link to visit another site, and returning back to a.com. Therefore, the pattern would be repeated if the system navigated back to a.com from e.com.

Figure 11:
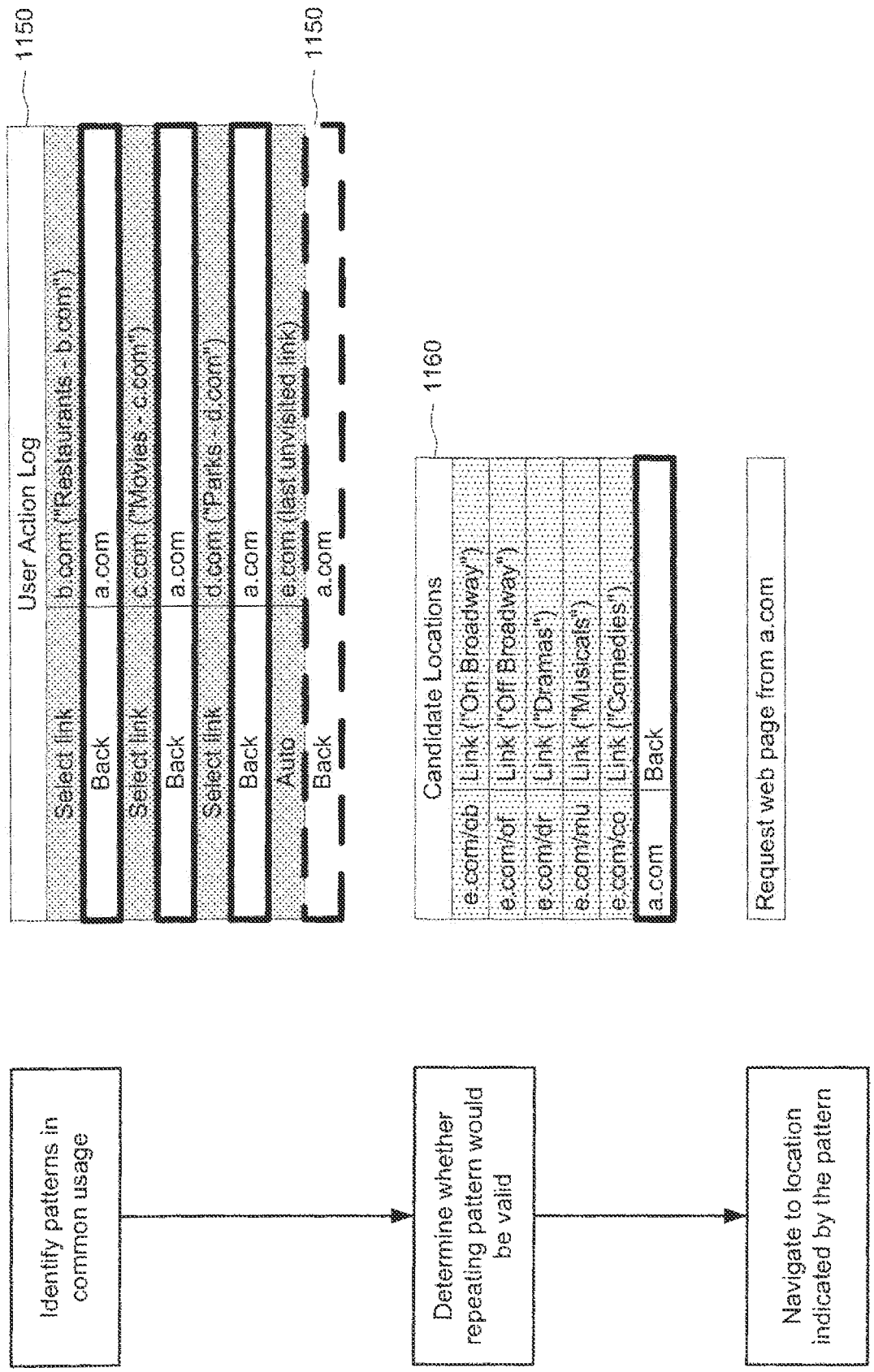
FIG. 11 is a flow chart and a diagram of sample data in accordance with an aspect of the system and method.

The system may determine a pattern of conduct based on the log of the user's actions. By way of example and as shown in FIG. 11, the processor may look for actions that are repeated in the user action log 1150. The processor may analyze the log and detect that the user always returned back to a.com after visiting another page. In that regard, the processor may also determine that the user is currently at another page. Accordingly, the processor may select going back to a.com as a candidate action (as indicated by reference box 1150).

The system may further compare the candidate action 1150 (selected based on the pattern) with the list 1160 of candidate locations. In that regard, the system may also determine that a.com is on the list of candidate locations because the back button is currently associated with a.com. Accordingly, because repeating the pattern is consistent with the user's current location, the system navigates to the location indicated by the pattern: a.Com.

Figure 12:
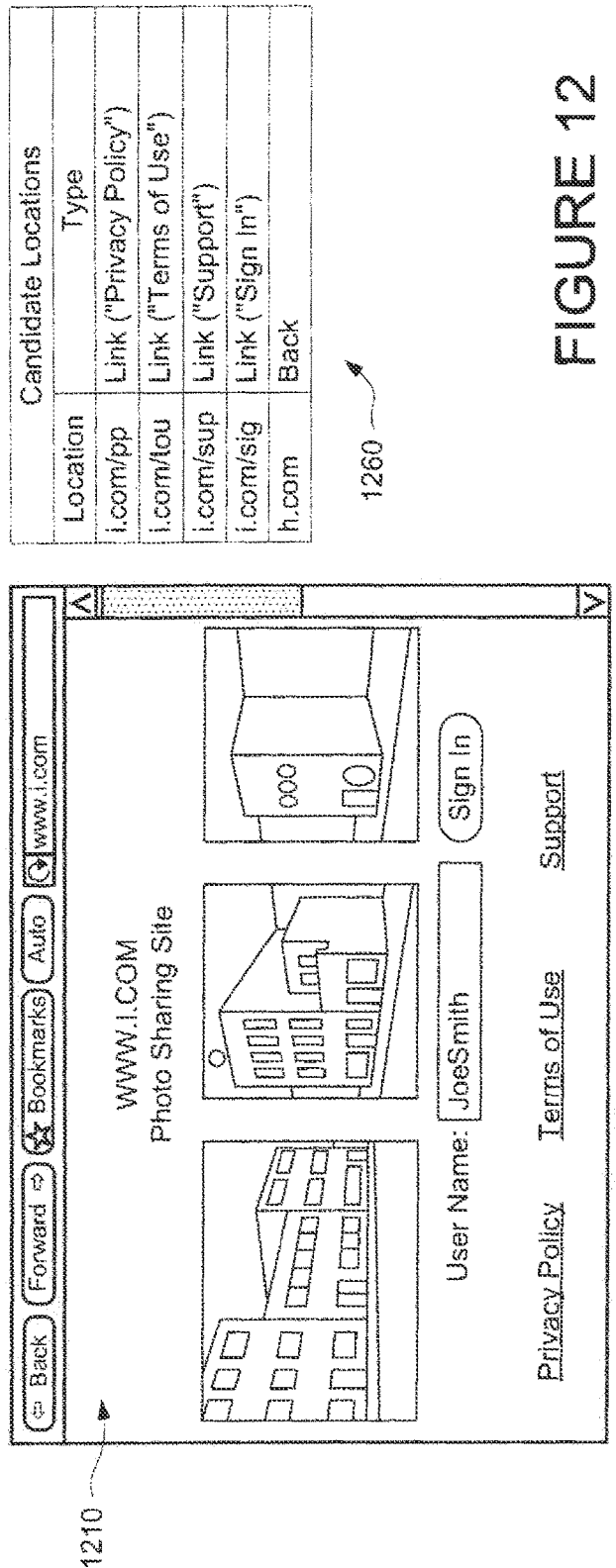
FIG. 12 is a screen shot and diagram of sample data in accordance with an aspect of the system and method.

Various aspects of the system use other patterns in a user's history to predict the user's navigation interest. FIG. 12 illustrates the example of a user that is currently viewing a page 1210 from a photo sharing site. As indicated by record 1264 of user log 1250, the user identified the web page by typing the page's location (e.g., URL) into the browser. The system further identified a number of candidate locations 1260, which include links to sign in and links to legal information such as the site's privacy policy and terms of use.

In one aspect, the system may predict the user's interest based on the visual appearance of the links. The system may further make the determination based on the similarity of the currently-viewed links relative to previously selected and unselected links. By way of example, user log 1250 may identify previously-selected links such as those identified by records 32, 35 and 48. The log may also identify links that were previously displayed to the user but not selected, such as records 33, 34 and 49. The log 1250 further indicates that the user viewed links displaying the text "Privacy Policy" and "Check email" (records 33-34), yet the user selected neither link.

Figure 13:
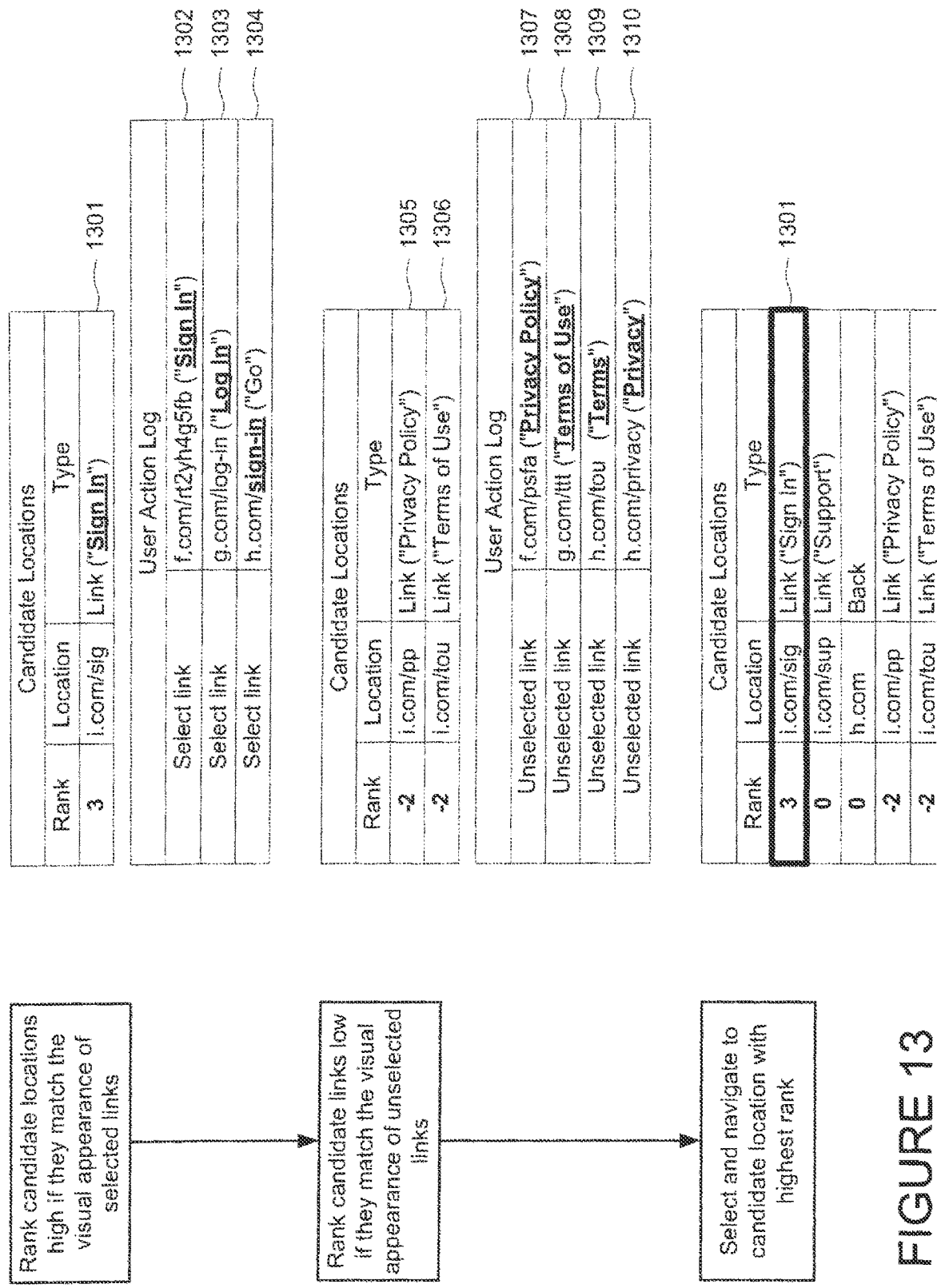
FIG. 13 is a flow chart and a diagram of sample data in accordance with an aspect of the system and method.

The system may rank a set of potential locations such that locations are ranked high if their associated links are visually similar to links selected by the user, but ranked low if they are visually similar to links not selected by the user. As shown in FIG. 13, the processor may determine that the currently-visible "Sign In" link 1301 visually corresponds with three other links 1302-04 that the user selected when the user viewed other sites. Specifically, the "Sign In" link 1301 at i.com perfectly matches the text of link 1302 displayed on site f.com and selected by the user. The processor may also determine that "Sign In" is sufficiently similar to the "Log In" text of previously-selected link 1303. The processor may further determine that link 1301 visually corresponds with previously-selected link 1304 because— while link 1304 displayed the word "Go"—the target location of link 1304 referred to the words "Sign In" as well. (In other aspects, comparing links based on visual similarity may require the visual characteristics of both the candidate link and the previously displayed link to be similar without regard to the URL of the target location.)

The system may rank the candidates based on a weighted function. For example, the processor may assign candidate link 1301 a ranking value of 3 points because it matched three different, previously selected links.

Conversely, the system may assign different ranking values when the candidate link is visually similar to previously viewed yet unselected links. In that regard, the processor may assign the "Privacy Policy" link a score of −2 because it matched two unselected links 1307 and 1310 from other websites. The "Terms of User" link 1306 may receive a similar negative ranking based on its similarity to unselected links 1308-09. (It will be understood that, in other ranking functions, items with lower scores are actually ranked higher, e.g., the highest ranked item is the item having the non-negative score that is closest to zero.)

After the system has assigned ranking values to each of the potential candidates, the system may navigate to the highest-ranked candidate. In the example of FIGS. 12-13, the processor would thus select the location associated with "Sign In" link 1301 because it was ranked the highest.

When modeling the user's interest based on past actions, the system may accord greater or lesser weight to actions that are more recent than old. For example, if a page includes two links named "Link A" and "Link B" and the user selected the same (or similar) links an equal number of times in the past, the processor may rank "Link A" higher if it (or its similar links) were more recently selected than "Link B".

When modeling the user's interest based on past actions, the system may also accord greater or lesser weight to actions that occurred more often than other actions. For example, if a page includes two links named "Link A" and "Link B" and the user selected other links with the text "Link A" more often than other links with the text "Link B", the processor may rank "Link A" higher than "Link B".

Yet further, the system may model the user's interest based on both the quantity and timing of previous occurrences, e.g., as a function of frequency.

The system may combine various ranking methods together to increase the likelihood that the system has selected the location of greatest interest to the user. For example, as shown in FIG. 14, the processor may analyze and conclude that the last two actions 1404 and 1405 in the user action log 1250 are similar to actions 1401 and 1402, namely, the user typed a URL and then entered text into a textbox. Because the user previously selected a link 1403 after typing the URL and entering text, the processor may determine which candidate location 1260 would complete the pattern the best. In that regard, the processor may determine that the "Sign In" link 1301 fits the pattern the best because it is visually similar to the link in the prior pattern. Accordingly, because it also fits a previous pattern, the processor may increase the ranking value of link 1301.

In yet another aspect, the system may select a link based on the likelihood that the user was currently viewing the link when the user requested automatic navigation to another location. FIG. 15 illustrates a sample HTML document 1510 that includes a variety of text and links (the links being in bold and underlines). Document 1510 is assumed to be long enough that the entire document is not viewable in the area of the browser used to display documents. Rather, as shown in screen shots 1501-03, the user would have to view the document in portions by scrolling the display area by hitting the page down key or moving the scroll bar to positions 1511-13, respectively. For ease of explanation, the term "screen page" refers to the portion of an HTML document or other information that is currently being shown to a user on the user's display device (e.g., computer screen). In that regard, it will be understood that the position of links relative to a computer screen may change because, inter alia, the position of the links within the display area of the displayed browser may change.

Figure 16:
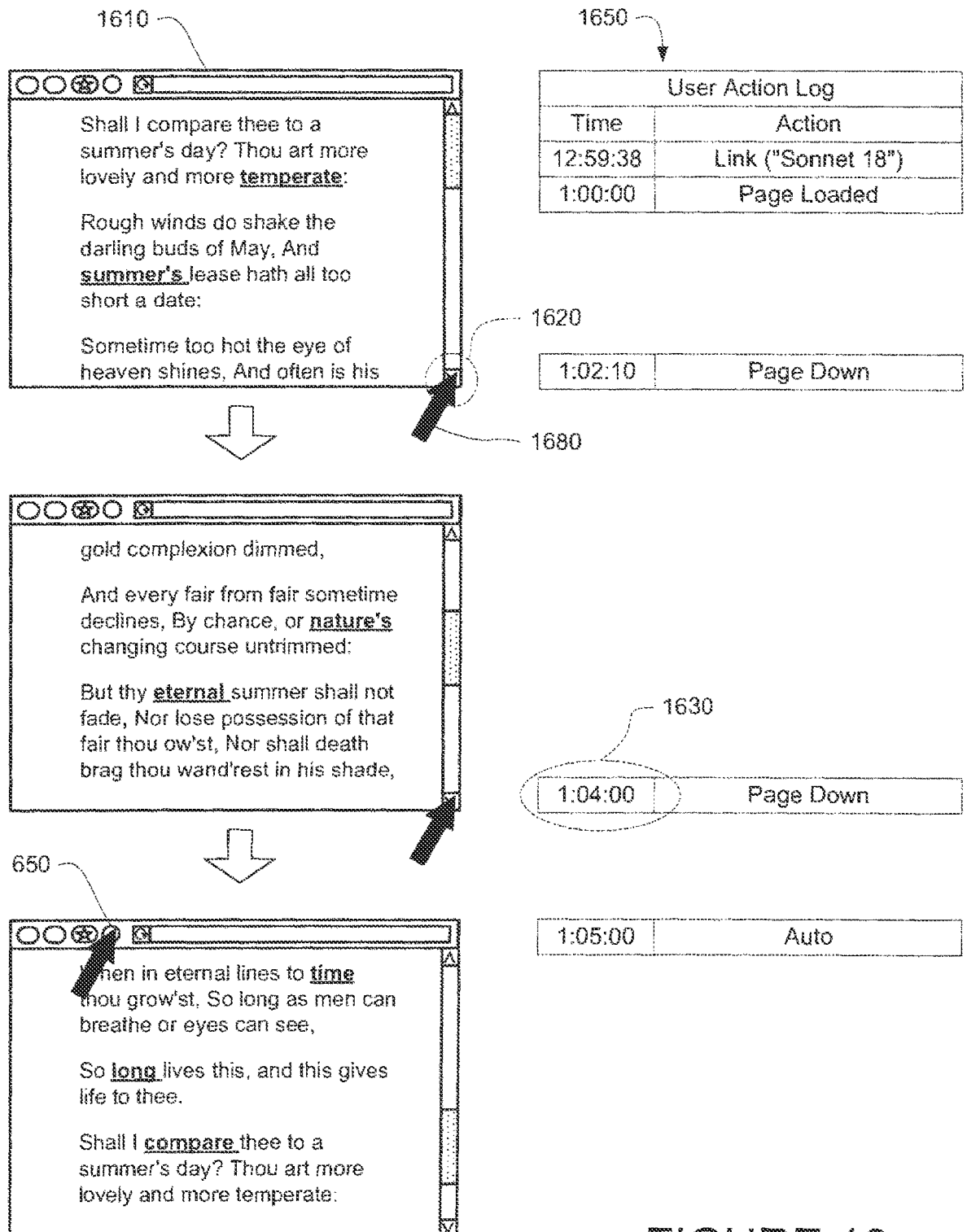
FIG. 16 is a diagram of the collection of sample data and corresponding screen shots in accordance with an aspect of the system and method.

As shown in FIG. 16, the system may track not only locations that the user selects, but other manipulations of the user interface as well. By way of example, the user action log 1650 may track each time the user hit the "Page Down" key on the keyboard or used mouse cursor 1680 to select the page down button 1620 on the browser 1610. The system may also store the date and time 1630 of the event in the log. Yet further, the system may store other events independent of the user's manipulation of the user interface, such as the date and time that a web page was loaded and visible to the user. As shown in FIG. 16, the example web page was loaded at 1:00:00 pm and the user clicked the automatic navigation button 650 on the browser at 1:05:00 pm. In between these actions, the user pressed the page down button twice (i.e., twice requested that the browser display the next screen page of the document).

Figure 17:
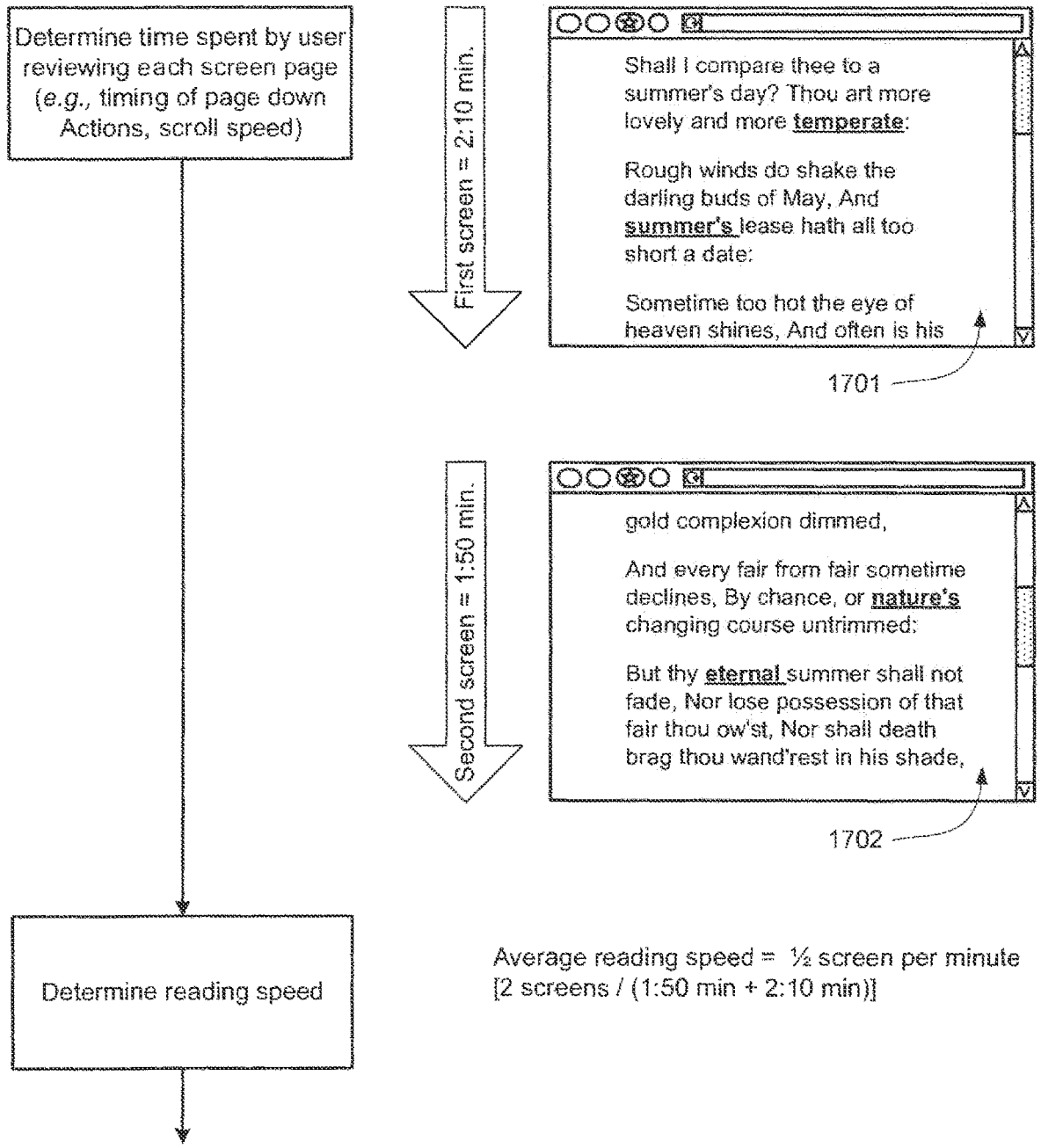
FIG. 17 illustrates a flow chart, screen shots, and sample data in accordance with an aspect of the system and method.

In order to estimate the link (if any) that the user was viewing when the user requested automatic navigation, the system may estimate the reading speed of the user. As shown in FIG. 17, the processor may use the event log to determine how long the user spent reading prior screens pages. For example, the first screen page 1701 was loaded at 1:00:00 pm and the user clicked the page down button at 1:02:10 pm. Accordingly, the processor may estimate that it took the user 2 minutes and 10 seconds to read screen page 1701. Because the user clicked the page down button again at 1:04:00, the processor may estimate that it took the user 1 minute and 50 seconds to read screen page 1702. It thus appears that the user is reading an average of one-half of a screen page every minute (e.g., 2 screens/(1:50 minutes+2:10 minutes)). If the user scrolled the page one line at a time (such as by repeatedly hitting the down arrow on the keyboard) or by dragging the scroll bar, the timing of these and other events may also be used to determine reading speed.

Figure 18:
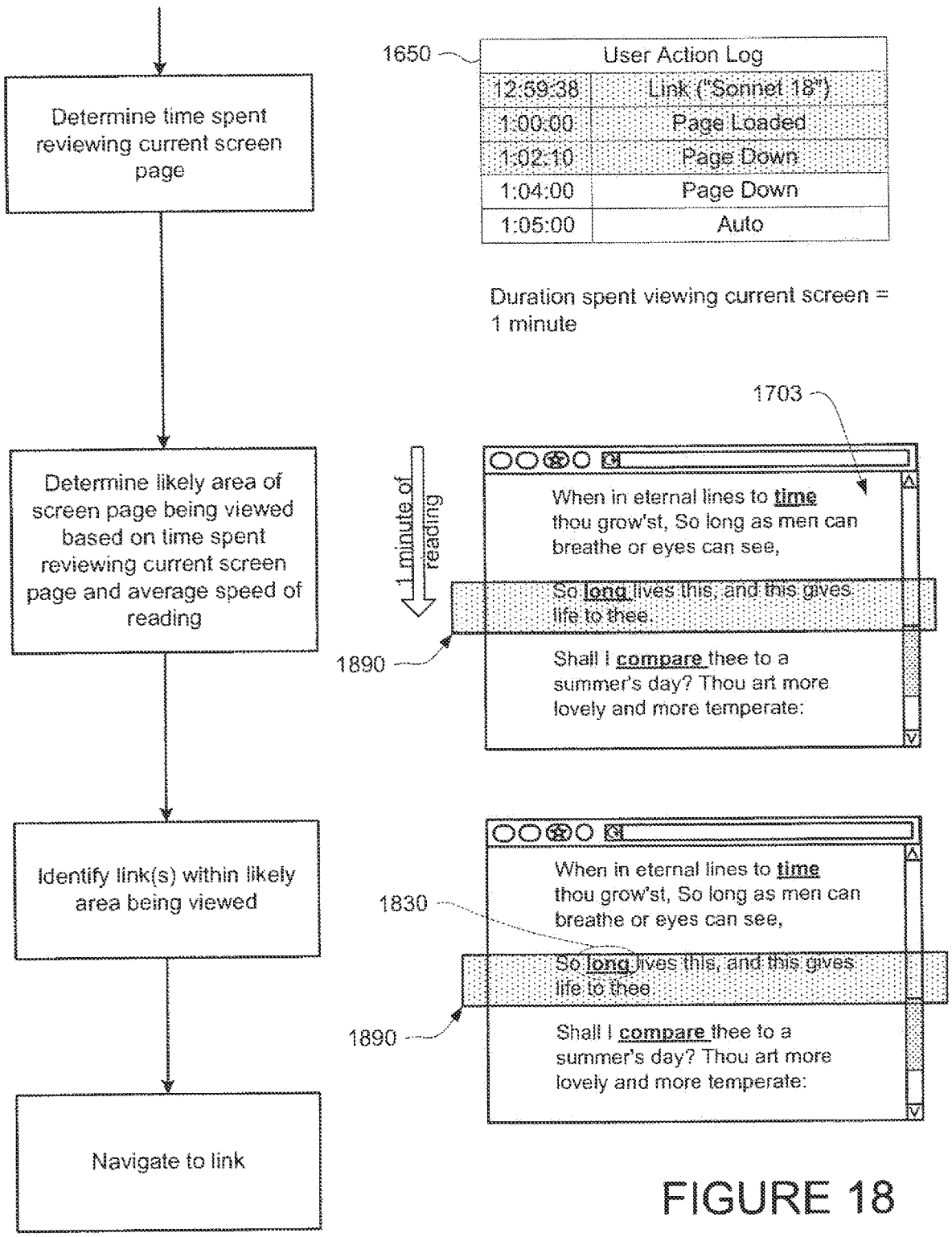
FIG. 18 illustrates a flow chart, screen shots, and sample data in accordance with an aspect of the system and method.

Once the system determines the reading speed, the system may estimate the portion of the document that the user was reading when the user requested automatic navigation. In one aspect, the processor determines this information by determining the amount of time that the user has been reviewing the current screen page. As shown in FIG. 18, the log 1650 indicates that the user paged to the current screen at 1:04 and requested automatic navigation at 1:05. Accordingly, the user has spent one minute reading the current screen page 1703. Based on that calculation and the user's estimated reading speed of one-half screen-page per minute, the processor may determine that the user was reading the middle 1890 of screen page 1703 when the user requested automatic navigation.

The system may then select the link that is closest to the portion of the screen that the user is estimated to be viewing. In that regard, because link 1830 ("long") is in the proximity of estimated viewing area 1890, the processor may navigate to the location associated with link 1890.

As noted above, the various methods for determining the link of may be combined together. In that regard, if multiple links were found proximate to the estimated viewing area 1890, the link may be chosen based on whether the link's location had been previously visited, visually similar links had been previously selected, etc.

Figure 19:
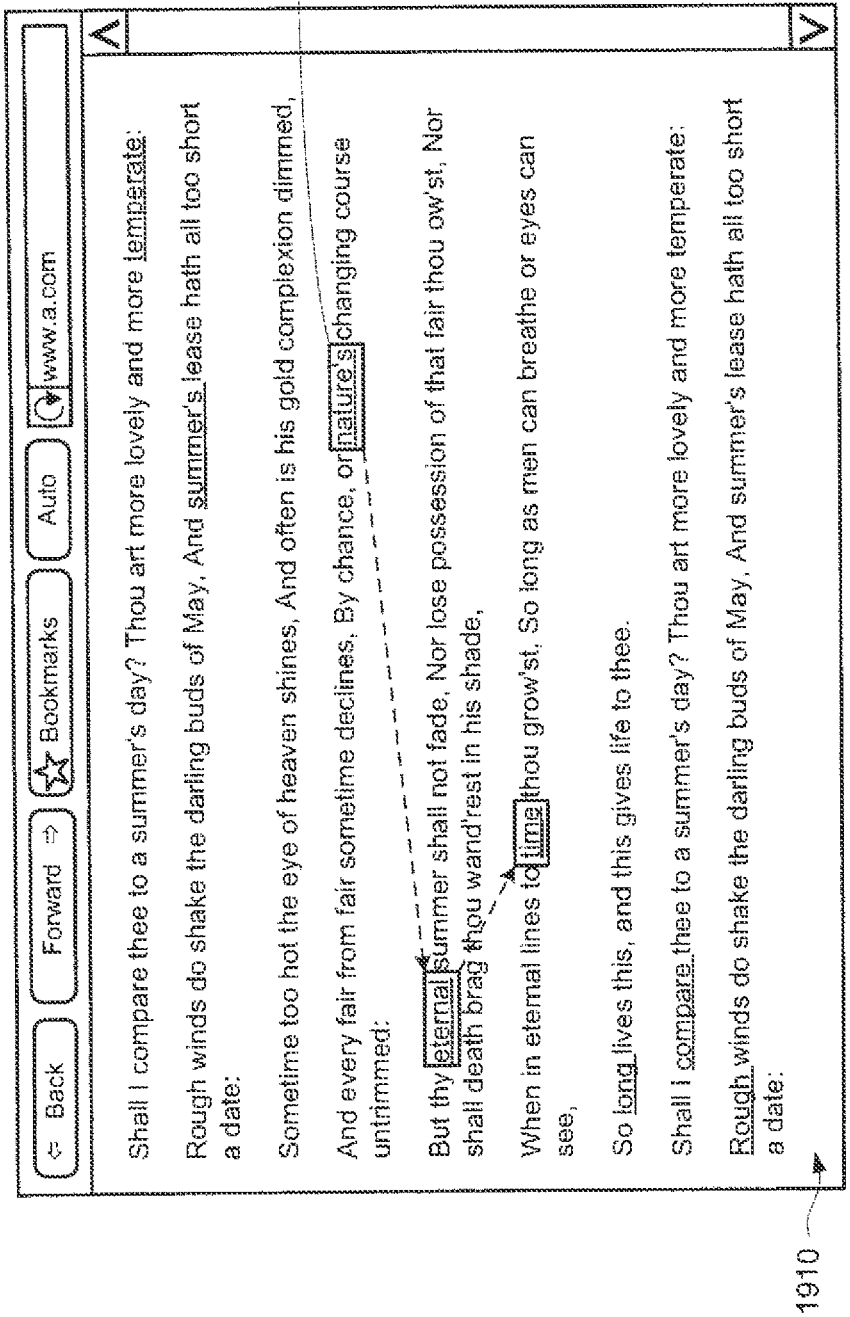
FIG. 19 is a screen shot in accordance with an aspect of the system and method.

In one aspect, the system may provide the user with a visual indication of the link that the browser would select if the user requested automatic navigation. For example, as shown in FIG. 19, the processor may draw a box 1930 around the link "nature's" after the web page 1910 was loaded and displayed, thus indicating that requesting automatic navigation will result in the browser navigating to that link's target location. If the predicted link changes over time, the processor may change the indication accordingly. In that regard, if the predicted link changed from "nature's" to "eternal" because the processor is continuously estimating the user's reading position as a function of elapsed time, box 1930 may move from the link "nature's" to link "eternal" as time elapses.

In one aspect, the system may allow certain users to view and navigate all desired web page with only three keys of a keyboard. As shown in FIG. 20, browser 2010 may execute on personal computer 2020 and all navigation may be based on the computer's prediction of the user's interest. In that regard, the browser may provide a single navigation automatic navigation button 2030 that is operated by the user pressing "Enter" key 2040 on the keyboard 2050. Yet further, the user may scroll the page 2015 within the browser 2010 by operating the "Page Up" and "Page Down" keys 2041-42 of keyboard 2050. In that regard and in one possible aspect of the system, the user need not operate mouse 2051 to view web pages or navigate between them. Such a system may help those users that have difficulty using a mouse, such as those with accessibility challenges.

Even if a browser in accordance with the aspect shown in FIG. 20 provides typical mouse-enabled features such as back and forward buttons and the like, it will be appreciated that various aspects of the system will be considered by many users to provide an improved keyboard browsing experience. By way of example, users may use a single key to navigate to their desired location without having to use a mouse to select a button or link, or without having to use various keys to move a cursor to the desired link. In that regard, some aspects of the system may be particularly advantageous in certain circumstances when used with text-oriented browsers.

One of the advantages of the invention is its ability to accommodate a wide variety of alternatives and additions to the foregoing features.

Various other signals may be used to build a model of the user's interest, and may be continuously evaluated to predict the link the user will select next. For example, a link may also be selected based on its prominence, e.g., large-font links disposed along the top of the web page without any surrounding text may be ranked higher than smaller-font links disposed within the middle of a paragraph.

An entire set of heuristics also may be used to predict the link. Indeed, information independent of the user's actions may be factored in as well such as the popularity of the link to other users.

The system may select from any number of different types of locations when the user requests automatic navigation. By way of example, the system may select from the links contained in the browser's list of bookmarks. The system may also select from any previously visited link. Yet further, the browser may select from links provided by an independent source, such as a list of links transmitted by server 110.

Yet further, the system may be used in connection with applications other than browsers. By way of example, collecting timing information associated with a user's scrolling of pages in text editors, Acrobat PDF viewers, slideshow viewers and the like may allow users to automatically scroll through the documents.

As the system is used, the system may learn to predict the user's interest with greater accuracy. In one aspect, the processor may get better based on the additional information and the ability to detect additional patterns. In another aspect, the processor may interpret certain behaviors as indicating that the previously-determined link was incorrectly selected. For example, if the system automatically navigated via a first link and the user went back to the prior page and selected a different link, the system may interpret this as an indication that the user did not agree with the system's choice. In that regard, when considering similar links to the first link in the future, the system may rank such links lower.

The system may also include features that allow the user to teach the system more directly. The browser may suggest a selection and provide the user with a chance to reject the selection prior to navigation. The browser may also permit a user to indicate that certain methods should be given greater weight than other methods (e.g., unvisited links should be ranked higher than links that are visually similar to previously-selected links).

In other aspects, functions described above as being performed by the server may be performed by the client device, and vice versa. For example, the client device may upload the user action log 350 to the server 110 and the server may redirect the user to the client to a location selected by the server. In yet more aspects, the client device and server perform and share different functions.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising:
   storing, by one or more processors, a user action log in a memory that identifies a set of actions performed in a browser by a user, wherein one or more of the actions indicate whether a link of a website associated with the action was previously selected by the user;
   generating, by the one or more processors, a list of candidate locations to navigate to via a web page that is currently displayed;
   comparing, by the one or more processors, the list of candidate locations to the user action log; and
   based on the comparing, selecting for display, by the one or more processors, a candidate location in the list of candidate locations that is most similar to a previously selected link in the user action log.

2. The method of claim 1, further comprising:
   determining, by the one or more processors, a usage pattern based on the user action log, the usage pattern including at least one of a currently-displayed link, a previously-selected link, or an unselected link.

3. The method of claim 2, wherein the usage pattern indicates that the browser navigated back to a same website of a plurality of websites after having navigated to another one of the plurality of websites.

4. The method of claim 3, wherein the same website is a home page and the another one of the plurality of websites is a website that is accessible from the home page.

5. The method of claim 3, further comprising:
   determining, by the one or more processors, a link that is likely to be of interest to the user.

6. The method of claim 5, further comprising:
   receiving, by the one or more processors, a request to obtain information from the another one of the plurality of websites; and
   automatically selecting, by the one or more processors, the link that is likely to be of interest to the user.

7. The method of claim 5, wherein the link that is likely to be of interest to the user is determined by looking for one or more patterns in the user action log.

8. The method of claim 1, wherein the list of candidate locations includes all links contained in the web page that is currently displayed.

9. A system comprising:
   a memory; and
   one or more processors coupled with the memory, the one or more processors configured to:
      store a user action log in the memory that identifies a set of actions performed in a browser by a user, wherein one or more of the actions indicate whether a link of a website associated with the action was previously selected by the user;
      generate a list of candidate locations to navigate to via a web page that is currently displayed;
      compare the list of candidate locations to the user action log; and
      based on the comparison, select for display a candidate location in the list of candidate locations that is most similar to a previously selected link in the user action log.

10. The system of claim 9, wherein the one or more processors are further configured to determine a pattern includes based on the user action log, the usage pattern including at least one of a currently-displayed link, a previously-selected link, or an unselected link.

11. The system of claim 10, wherein the usage pattern indicates that the browser navigated back to a same website of a plurality of websites after having navigated to another one of the plurality of websites.

12. The system of claim 11, wherein the same website is a home page and the another one of the plurality of websites is a website that is accessible from the home page.

13. The system of claim 11, wherein the one or more processors are further configured to determine a link that is likely to be of interest to the user.

14. The system of claim 13, wherein the one or more processors are further configured to receive a request to obtain information from the another one of the plurality of websites, and automatically select the link that is likely to be of interest to the user.

15. The system of claim 13, wherein the link that is likely to be of interest to the user is determined by looking for one or more patterns in the user action log.

16. The system of claim 9, wherein the list of candidate locations includes all links contained in the web page that is currently displayed.

17. A non-transitory recording medium on which instructions are stored, the instructions when executed by one or more processors, cause the one or more processors to perform a method comprising:
   storing a user action log in a memory that identifies a set of actions performed in a browser by a user, wherein one or more of the actions indicate whether a link of a website associated with the action was previously selected by the user;
   generating a list of candidate locations to navigate to via a web page that is currently displayed;
   compare the list of candidate locations to the user action log; and
   based on the comparison, selecting for display a candidate location in the list of candidate locations that is most similar to a previously selected link in the user action.

18. The non-transitory recording medium of claim 17, wherein the method further comprises:

determining a usage pattern based on the user action log, the usage pattern including at least one of a currently-displayed link, a previously-selected link, or an unselected link.

19. The non-transitory recording medium of claim 18, wherein the usage pattern indicates that the browser navigated back to a same website of a plurality of websites after having navigated to another one of the plurality of websites.

20. The non-transitory recording medium of claim 19, wherein the same website is a home page and the another one of the plurality of websites is a website that is accessible from the home page.

21. The non-transitory recording medium of claim 19, wherein the method further comprises determining a link that is likely to be of interest to the user.

22. The non-transitory recording medium of claim 21, wherein the method further comprises:

receiving a request to obtain information from the another one of the plurality of websites; and
automatically selecting the link that is likely to be of interest to the user.

23. The non-transitory recording medium of claim 21, wherein the link that is likely to be of interest to the user is determined by looking for one or more patterns in the user action log.

24. The non-transitory recording medium of claim 17, wherein the list of candidate locations includes all links contained in the web page that is currently displayed.

25. The method of claim 1, wherein the candidate location selected for display is visually similar to a previously selected link.

26. The system of claim 9, wherein the candidate location selected for display is visually similar to a previously selected link.

* * * * *